United States Patent Office 2,972,112
Patented Feb. 14, 1961

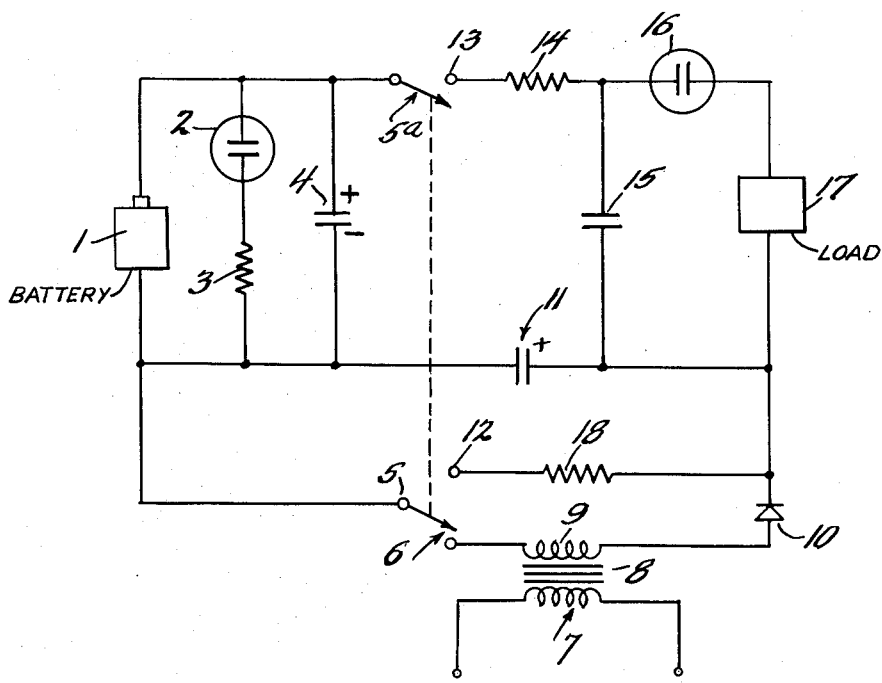

2,972,112
DELAY TIMER

Jeremiah E. Langan, Cresskill, N.J., assignor to Leesona Corporation, Cranston, R.I., a corporation of Massachusetts Filed Feb. 28, 1958, Ser. No. 718,347

4 Claims. (Cl. 328—72)

This invention relates to delay timing circuits, and particularly to such circuits which are adjustable to produce time delays of intervals ranging from nearly zero seconds to several minutes. A delay timing circuit according to this invention depends in part on the use of previously stored energy and in part on energy accumulated during the time interval. A feature of the circuit is an infinitely adjustable time delay interval actuated by an imposed alternating current of continuously variable amplitude.

In general, the circuit is powered in part by a fixed voltage power circuit consisting of a constant current nuclear battery, a cold cathode diode with resistance in series with it, and a capacitor which is maintained at constant potential by the diode.

A supplementary capacitor is variably charged by means of a rectified alternating current of variable amplitude. This capacitor with its selected charge is connected to the precharged condenser in the nuclear battery circuit in order that the two condensers can share charge with a third condenser and bring it to the discharge potential of a diode associated with the third capacitor. The rate of charge of this third capacitor is dependent on the magnitude of the charge resulting from the rectified variable applied alternating current. The rate of charge on the third capacitor determines the timing interval.

A time delay comprising the described circuit provides a number of advantages. Such a timer is particularly useful in applications where an infinitely adjustable time delay within certain time limits is required, and the timer is largely independent of temperatures and pressure changes over wide ranges. The delay circuit contains only electrical components and is free of mechanical limitations due to mechanical fatigue and mechanical forces due to large accelerations and vibrations. The circuit provides an essentially linear relationship between the amplitude or peak voltage of the applied alternating current used as the time selector and the time interval produced, and the circuit produces a pulse of relatively large energy compared to the current intensity of the nuclear battery by utilizing energy stored before the beginning of the timing interval. The nuclear battery power source assures long shelf and use life dependent primarily on the life of the voltage regulating diode. The nuclear battery is also free from liquid leaking problems.

It will be understood, however, that the circuit is not necessarily limited to the use of a nuclear battery as other sources of direct current voltage can be used.

The exemplary circuit illustrated in Figure 1 can be considered as consisting of several parts; a constant voltage stored energy circuit, a circuit to introduce the time interval defining signal, a circuit to combine the stored energy and the time interval defining circuit, and finally the circuit to transfer the electrical pulse to the load at the end of the desired time interval.

The constant voltage stored energy circuit includes a constant voltage circuit consisting of battery 1, preferably but not necessarily a constant current nuclear battery, a gas discharge diode 2 with a resistance 3 all connected in series.

The capacitor 4 is connected in parallel circuit with the battery and the series connected diode 2 and resistance 3.

The operation of this part of the circuit is as follows: Capacitor 4 is charged by the battery 1 until its voltage reaches the discharge potential of diode 2, whereupon diode 2 discharges and current flows through the resistance 3. The rate of discharge of the capacitor 4 through diode 2 and resistance 3 is restricted by the resistance 3. As capacitor 4 discharges its voltage drops, which results in a corresponding reduction of the voltage across the diode to the value where the diode discharge voltage is too low to maintain discharge. With no discharge in diode 2 the capacitor 4 again charges until the discharge voltage of diode 2 is again reached. Thus the voltage across the capacitor 4 is maintained cyclicly between the discharge and quenching voltages of the diode 2. In other words, capacitor 4 is maintained at an essentially fixed voltage except for the discharge diode ripple. The energy stored in this circuit is a function of the diode 2 discharge voltage and the capacitance of capacitor 4.

The time interval defining signal in the form of an alternating current signal is applied to the primary 7 of transformer 8. Previous to the initiation of the desired time interval switch arm 5 is in contact with contact point 6. Switch arm 5a is operatively connected with switch arm 5. Switch arm 5a is in open circuit position when switch arm 5 is connected to contact 6. The output of the secondary 9 of transformer 8 is half-wave rectified by the dry rectifier 10 of which a silicon diode is a preferred example and applied to capacitor 11 with polarity as shown on capacitor 11. The quantity of charge and consequently the voltage in capacitor 11 is proportional to the amplitude of the alternating current signal applied to primary 7.

The stored energy battery circuit and the alternating current actuated time interval defining circuit are combined at the beginning of the desired time interval by simultaneously connecting switch arm 5 to contact point 12 and switch arm 5a to contact point 13. Thus capacitor 4, resistance 14, capacitor 15 and capacitor 11 are connected in a series circuit. The charges on capacitors 4 and 11 are shared with capacitor 15, increasing its voltage, and the rate of discharge of the capacitor 11 is governed by the resistance 18. In general the rate build-up of voltage in capacitor 15 is a function of resistance 18 and capacitances of 4, 15 and 11 as well as the voltage discharge point of diode 2 and the magnitude of the rectified potential applied to capacitor 11. In any particular timer all of these elements except the magnitude of the rectified potential applied to capacitor 11 are fixed by design. Thus in a particular timer the build-up of charge on capacitor 15 is a function of the alternating current applied to primary 7.

The charge and resultant voltage on capacitor 15 continues to build up at the rate defined by the rectified alternating current until the voltage equals the discharge potential of diode 16 at which itme capacitor 15 discharges essentially instantaneously through the low resistance circuit through the load 17.

Resistance 18, in addition to governing the rate of discharge of capacitor 11, serves as a means of short-circuiting capacitor 11 so that the charge on this capacitor is reduced to zero to prepare it to receive the next time interval determining charge for the next use of the timer.

The following specific examples will further illustrate the operation of the exemplary timing circuit described above when supplied with components having the following values: nuclear battery 1, 100 μμa. constant current with equilibrium voltage 5,000–10,000 volts; gas discharge diode 2, 500 volts; gas discharge diode 16, 250 volts; capacitor 4, .03 μf., 600 volts; capacitor 11, .02 μf. 600 volts; capacitor 15, .01 μf., 400 volts; resistance 3, 100 megohms ±10%; resistance 14, 120 megohms ±5%; resistance 18, 800 megohms ±5%; and transformer 8, output voltage 0–500 volts.

The constant voltage stored energy circuit consisting of the 100 μμa. constant current nuclear battery 1 having an equilibrium voltage of approximately 5,000 to 10,000 volts, the 500 volt gas discharge diode 2, the 100 megohm resistor 3, the .03 μf. capacitor maintains an essentially constant voltage of 500 volts across the terminals of capacitor 4. The limits of constancy of the voltage across capacitor 4 are dependent on the selection of the gas diode and are usually 5%.

The time interval defining or selecting circuit consists of transformer 8 having 0 to 500 volt output rating, a silicon diode rectifier 10, a .02 μf. capacitor 11, and the 800 megohm resistor 18. The length of the time delay is determined by the alternating current input applied to primary 7 with switch arm 5 contacting contact point 6. This applied voltage results in a voltage output of from 0 to 500 volts from secondary 9, the current from 9 is rectified by diode 10 and applied to capacitor 11 to charge it to the potential determined by the output signal from secondary 9. Thus capacitor 11 is charged to a selected voltage between 0 and 500 volts. With capacitor 11 charged the circuit is set to give the desired interval after switch arm 5 is moved to contact 12 and switch arm 10 simultaneously contacts 13 to establish the beginning of the desired time interval.

In the series circuit 4, 5a, 13, 14, 15, 11 the capacitor 4 is charged to 500 volts with polarity as shown and capacitor 11 charged to between 0 and 500 volts with polarity as shown. When switch arm 5a contacts 13 capacitors 4 and 11 share charges with capacitor 15. The rate of flow of current in the circuit through the 120 megohm resistance 14 is dependent on the difference in voltage between capacitors 4 and 11 and on the respective capacitances of capacitors 4 and 11. If the difference approaches a maximum the time required to build up the charge on capacitor 15 to the 250 volts discharge potential of diode 16 is a minimum and approaches 0 seconds. As the voltage difference of capacitors 4 and 11 diminishes the rate of charging capacitor 15 decreases and the time required approaches 100 seconds to charge capacitor 15 to the 250 volt discharge value for diode 16.

Since capacitor 15, diode 16 and the load 17 are of relatively low resistance the discharge of capacitor 15 at the end of the timing interval is virtually instantaneous. The energy of discharge for the component values given in this example is approximately 2,000 ergs.

Having thus described the invention, what is claimed as new is:

1. A delay timing circuit comprising a constant voltage stored energy circuit having a nuclear battery, a diode and first resistance in series and a first capacitor in parallel with said battery, a time interval defining circuit comprising a transformer, a rectifier and a second capacitor connected in series with the secondary winding of said transformer, switch means operable to disconnect said second capacitor from said secondary winding and said rectifier and connect it in series with a second resistance, a third capacitor connected in series with a second diode and a load and connected in series with said first and second capacitors, said switch means completing said last-named series connection when operated as aforesaid.

2. A delay timing circuit comprising a first capacitor having a substantially constant voltage thereon, a time interval defining circuit comprising a transformer having a source of voltage of variable magnitude applied to the primary winding thereof, a rectifier and a second capacitor connected in series with the secondary winding of said transformer, switch means operable to disconnect said second capacitor from said secondary winding and said rectifier and connect it in series with a resistance, a third capacitor connected in series with a diode and a load and connected in series with said first and second capacitors, said switch means completing said last-named series connection when operated as aforesaid.

3. A delay timing circuit comprising a first capacitor having a substantially constant voltage thereon, a time interval defining circuit comprising a rectifier and a second capacitor connected in series with a source of voltage of variable magnitude, switch means operable to disconnect said second capacitor from said voltage source and said rectifier and connect it in series with a resistance, a third capacitor connected in series with a diode and a load and connected in series with said first and second capacitors, said switch means completing said last-named series connection when operated as aforesaid.

4. A delay timing circuit as claimed in claim 3 wherein said first capacitor is connected in parallel to a nuclear battery having a diode and resistance in series therewith.

References Cited in the file of this patent

UNITED STATES PATENTS

| | | |
|---|---|---|
| 2,357,652 | Haynes | Sept. 5, 1944 |
| 2,477,622 | Klemperer | Aug. 2, 1949 |